United States Patent
Yamaguchi et al.

(10) Patent No.: US 7,493,000 B2
(45) Date of Patent: Feb. 17, 2009

(54) CURABLE LIQUID RESIN OPTICAL FIBER UPJACKET COMPOSITION

(75) Inventors: Hiroshi Yamaguchi, Tokyo (JP); Satoshi Kamo, Tokyo (JP); Masanobu Sugimoto, Tokyo (JP); Takeo Shigemoto, Tokyo (JP); Kenneth Dake, South Elgin, IL (US)

(73) Assignees: DSM IP Assets B.V., Heerlen (NL); JSR Corporation, Tokyo (JP)

( * ) Notice: Subject to any disclaimer, the term of this patent is extended or adjusted under 35 U.S.C. 154(b) by 0 days.

(21) Appl. No.: 11/660,523

(22) PCT Filed: Aug. 30, 2005

(86) PCT No.: PCT/NL2005/000627

§ 371 (c)(1), (2), (4) Date: May 3, 2007

(87) PCT Pub. No.: WO2006/025734

PCT Pub. Date: Mar. 9, 2006

(65) Prior Publication Data

US 2008/0219635 A1     Sep. 11, 2008

(30) Foreign Application Priority Data

Aug. 30, 2004   (JP) .............................. 2004-250108

(51) Int. Cl.
*G02B 6/02* (2006.01)

(52) U.S. Cl. ...................................... 385/128; 385/141
(58) Field of Classification Search ................ 385/128
See application file for complete search history.

(56) References Cited

U.S. PATENT DOCUMENTS

2005/0261389 A1*  11/2005  Bratolavsky et al. .......... 522/71
2006/0115649 A1*   6/2006  Chien et al. ................ 428/375
2007/0203321 A1*   8/2007  Cattron et al. ............... 528/44

FOREIGN PATENT DOCUMENTS

WO     WO 98/41483      9/1998

OTHER PUBLICATIONS

XP002352864 & KR 2004 047 436 A, Jun. 5, 2004, Abstract.
International Search Report mailed Nov. 24, 2005 in PCT/NL2005/000627.
Written Opinion mailed Nov. 24, 2005 in PCT/NL2005/000627.

* cited by examiner

*Primary Examiner*—Sung H Pak
(74) *Attorney, Agent, or Firm*—Nixon & Vanderhye PC (57) ABSTRACT

The present invention provides a curable liquid resin composition which, when cured, exhibits excellent removability from an adjacent coating layer and is suitable for an optical fiber upjacket material. The curable liquid resin optical fiber upjacket composition comprising a urethane (meth)acrylate or a (meth)acrylate oligomer, a reactive diluent, a polymerization initiator, and a polyol compound having a molecular weight of 1500 or more.

16 Claims, 1 Drawing Sheet

CURABLE LIQUID RESIN OPTICAL FIBER UPJACKET COMPOSITION

This application is the US national phase of international application PCT/NL2005/000627 filed 30 Aug. 2005 which designated the U.S. and claims benefit of JP 2004-250108, dated 30 Aug. 2004, the entire content of which is hereby incorporated by reference.

FIELD OF THE INVENTION

The present invention relates to a curable liquid resin optical fiber upjacket composition applied to and cured on the surface of a resin-coated optical fiber.

BACKGROUND OF THE INVENTION

In the manufacture of optical fibers, a glass fiber is produced by spinning molten glass, and a resin coating is provided over the glass fiber for protection and reinforcement. This step is referred to as "fiber drawing". As the resin coating, a structure is known in which a flexible primary coating layer is formed on the surface of the optical fiber and a rigid secondary coating layer is applied over the primary coating layer. A structure is also known in which the resin-coated optical fibers are placed side by side on a plane and bundled with a bundling material to produce a ribbon-shaped coating layer. A resin composition for forming the primary coating layer is called a primary material, a resin composition for forming the secondary coating layer is called a secondary material, and a resin composition for forming the ribbon-shaped coating layer is called a ribbon matrix material.

The outer diameter of the resin-coated optical fiber is usually about 250 μm. The outer diameter is increased to about 500 μm by applying an additional resin layer to the resin-coated optical fiber in order to improve manual workability. Such a resin coating layer is usually called an "upjacket layer". Since the upjacket layer does not require optical properties, the upjacket layer need not have transparency. The upjacket layer may be colored for identification by naked eye observation. It is important that the upjacket layer be easily removed from the resin-coated optical fiber without causing damage to the underlying primary or secondary coating layer when connecting the resin-coated optical fibers.

A curable resin used as the optical fiber coating material, including the material for the upjacket layer, is required to have superior coatability which allows high speed fiber drawing; sufficient strength and flexibility; excellent heat resistance; excellent weatherability; superior resistance to acid, alkali, and the like; excellent oil resistance; small degrees of water absorption and hygroscopicity; low hydrogen gas generation; excellent liquid storage stability; and the like.

However, since a related-art upjacket material firmly adheres to the overlying ribbon matrix material layer or underlying primary or secondary coating layer, the upjacket layer may be damaged when removing the ribbon matrix material layer to expose the resin-coated optical fiber, or the primary or secondary coating layer may be damaged when removing the upjacket layer from the resin-coated optical fiber. This hinders optical fiber connection workability.

As curable liquid resin optical fiber upjacket compositions provided with improved removability, a composition containing three types of polysiloxane compounds (patent document 1), and a composition containing organic or inorganic material particles (patent documents 2 and 3) have been disclosed.

[Patent document 1] Japanese Patent Application Laid-open No. 10-287717

[Patent document 2] Japanese Patent Application Laid-open No. 9-324136

[Patent document 3] Japanese Patent Application Laid-open No. 2000-273127

However, an upjacket layer formed by using the above-mentioned composition exhibits insufficient removability.

SUMMARY OF THE INVENTION

An objective of the present invention is to provide a curable liquid resin optical fiber upjacket composition that exhibits an excellent function as an optical fiber coating material and, when cured, has excellent removability from an adjacent coating layer.

In the present invention, various urethane (meth)acrylate-containing curable liquid resin compositions have been prepared, and the functions and removability of the resulting cured products as an optical fiber upjacket layer has been examined. As a result, it was found that the above objective can be achieved by adding a polyol compound having a specific molecular weight.

Specifically, the present invention provides a curable liquid resin optical fiber upjacket composition, comprising:

(A) 30 to 90 wt % of a urethane (meth)acrylate, (B) 1 to 70 wt % of a reactive diluent, (C) 0.1 to 10 wt % of a polymerization initiator, and (D) 0.1 to 50 wt % of a polyol compound having a molecular weight of 1500 or more, with the total amount of the components (A), (B), and (C) being 100 wt %.

The present invention also provides a curable liquid resin optical fiber upjacket composition, comprising:

(A) 30 to 90 wt % of a (meth)acrylate oligomer, (B) 1 to 70 wt % of a reactive diluent, (C) 0.1 to 10 wt % of a polymerization initiator, and (D) 0.1 to 50 wt % of a polyol compound having a molecular weight of 1500 or more, with the total amount of the components (A), (B), and (C) being 100 wt %.

The present invention also provides an optical fiber upjacket layer comprising a cured product of the curable liquid resin optical fiber upjacket composition of the invention.

The present invention further provides an upjacketed optical fiber comprising the optical fiber upjacket layer.

The present invention also relates to a process of making an optical fiber upjacket layer comprising the step of curing the liquid resin optical fiber upjacket composition.

The present invention further relates to the use of the optical fiber upjacket layer as a coating having good removability.

Since an optical fiber upjacket layer obtained by using the resin composition of the present invention has sufficient strength and weatherability and exhibits excellent removability, optical fiber connection workability can be improved.

DESCRIPTION OF THE INVENTION

The urethane (meth)acrylate (A) of the present invention is produced by reacting a polyol, a diisocyanate, and a hydroxyl group-containing (meth)acrylate. Specifically, the urethane (meth)acrylate (A) is produced by reacting isocyanate groups of the diisocyanate with a hydroxyl group of the polyol and a hydroxyl group of the hydroxyl group-containing (meth) acrylate.

This reaction is carried out by reacting the polyol, diisocyanate, and hydroxyl group-containing (meth)acrylate all together; reacting the polyol and the diisocyanate, and reacting the resulting product with the hydroxyl group-containing (meth)acrylate; reacting the diisocyanate and the hydroxyl group-containing (meth)acrylate, and reacting the resulting product with the polyol; or reacting the diisocyanate and the hydroxyl group-containing (meth)acrylate, reacting the resulting product with the polyol, and further reacting the resulting product with the hydroxyl group-containing (meth)acrylate, for example.

As examples of the polyol preferably used in this reaction, a polyether polyol, polyester polyol, polycarbonate polyol, polycaprolactone polyol, and the like can be given. There are no specific limitations to the manner of polymerization of the structural units of these polyols, which may be any of random polymerization, block polymerization, and graft polymerization. As examples of the polyether polyol, polyethylene glycol, polypropylene glycol, polytetramethylene glycol, polyhexamethylene glycol, polyheptamethylene glycol, polydecamethylene glycol, aliphatic polyether polyol obtained by ring-opening copolymerization of two or more ion-polymerizable cyclic compounds, and the like can be given. As examples of the ion-polymerizable cyclic compound, cyclic ethers such as ethylene oxide, propylene oxide, butene-1-oxide, isobutene oxide, 3,3-bischloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyloxetane, vinyltetrahydrofuran, vinylcyclohexene oxide, phenyl glycidyl ether, butyl glycidyl ether, glycidyl benzoate, and the like can be given. Moreover, a polyether polyol obtained by ring-opening copolymerization of the above ion-polymerizable cyclic compound with a cyclic imine such as ethyleneimine, cyclic lactonic acid such as β-propyolactone or glycolic acid lactide, or dimethylcyclopolysiloxane may be used. As examples of specific combinations of two or more ion-polymerizable cyclic compounds, tetrahydrofuran and propylene oxide, tetrahydrofuran and 2-methyltetrahydrofuran, tetrahydrofuran and 3-methyltetrahydrofuran, tetrahydrofuran and ethylene oxide, propylene oxide and ethylene oxide, butene-1-oxide and ethylene oxide, a ternary copolymer of tetrahydrofuran, butene-1-oxide, and ethylene oxide, and the like can be given. The ring-opening copolymer of the ion-polymerizable cyclic compounds may either be a random copolymer or a block copolymer.

These aliphatic polyether polyols are commercially available as PTMG650, PTMG1000, PTMG2000 (manufactured by Mitsubishi Chemical Corp.), PPG400; PPG1000, PPG2000, PPG3000, Excenol 720, 1020, 2020 (manufactured by Asahi Glass Urethane Co., Ltd.), PEG1000, Unisafe DC1100, DC1800 (manufactured by Nippon Oil and Fats Co., Ltd.), PPTG2000, PPTG1000, PTG400, PTGL2000 (manufactured by Hodogaya Chemical Co., Ltd.), Z-3001-4, Z-3001-5, PBG2000A, PBG2000B (manufactured by Daiichi Kogyo Seiyaku Co., Ltd.), and the like.

Examples of the polyether polyol further include cyclic polyether polyols such as alkylene oxide addition polyol of bisphenol A, alkylene oxide addition polyol of bisphenol F, hydrogenated bisphenol A, hydrogenated bisphenol F, alkylene oxide addition polyol of hydrogenated bisphenol A, alkylene oxide addition polyol of hydrogenated bisphenol F, alkylene oxide addition polyol of hydroquinone, alkylene oxide addition polyol of naphthohydroquinone, alkylene oxide addition polyol of anthrahydroquinone, 1,4-cyclohexane polyol and alkylene oxide addition polyol thereof, tricyclodecane polyol, tricyclodecanedimethanol, pentacyclopentadecane polyol, and pentacyclopentadecanedimethanol. Of these, alkylene oxide addition polyol of bisphenol A and tricyclodecanedimethanol are preferable. These polyols are commercially available as Uniol DA400, DA700, DA1000, DB400 (manufactured by Nippon Oil and Fats Co., Ltd.), tricyclodecanedimethanol (manufactured by Mitsubishi Chemical Corp.), and the like. Examples of other cyclic polyether polyols include alkylene oxide addition polyol of bisphenol A, alkylene oxide addition polyol of bisphenol F, and alkylene oxide addition polyol of 1,4-cyclohexane polyol.

As examples of the polyester polyol, a polyester polyol obtained by reacting a dihydric alcohol and a dibasic acid and the like can be given. As examples of the dihydric alcohol, ethylene glycol, polyethylene glycol, propylene glycol, polypropylene glycol, tetramethylene glycol, polytetramethylene glycol, 1,6-hexane polyol, neopentyl glycol, 1,4-cyclohexanedimethanol, 3-methyl-1,5-pentane polyol, 1,9-nonane polyol, 2-methyl-1,8-octane polyol, and the like can be given. Examples of the dibasic acid include phthalic acid, isophthalic acid, terephthalic acid, maleic acid, fumaric acid. adipic acid, and sebacic acid, and the like. These polyester polyols are commercially available as Kurapol P-2010, PMIPA, PKA-A, PKA-A2, PNA-2000 (manufactured by Kuraray Co., Ltd.), and the like.

As examples of the polycarbonate polyol, polycarbonate of polytetrahydrofuran, polycarbonate of 1,6-hexane polyol, and the like can be given. These polycarbonate polyols are commercially available as DN-980, 981, 982, 983 (manufactured by Nippon Polyurethane Industry Co., Ltd.), PC-8000 (manufactured by PPG), PC-THF-CD (manufactured by BASF), and the like.

As examples of the polycaprolactone polyol, polycaprolactone polyols obtained by reacting ε-caprolactone with a diol such as ethylene glycol, polyethylene glycol, propylene glycol, polypropylene glycol, tetramethylene glycol, polytetramethylene glycol, 1,2-polybutylene glycol, 1,6-hexane polyol, neopentyl glycol, 1,4-cyclohexanedimethanol, or 1,4-butane polyol, and the like can be given. These polyols are commercially available as Placcel 205, 205AL, 212, 212AL, 220, 220AL (manufactured by Daicel Chemical Industries, Ltd.), and the like.

Polyols other than those mentioned above may also be used. Given as examples of such polyols are ethylene glycol, propylene glycol, 1,4-butane polyol, 1,5-pentane polyol, 1,6-hexane polyol, neopentyl glycol, 1,4-cyclohexanedimethanol, dimethylol compound of dicyclopentadiene, tricyclodecanedimethanol, β-methyl-δ-valerolactone, hydroxy-terminated polybutadiene, hydroxy-terminated hydrogenated polybutadiene, castor oil-modified polyol, polyol-terminated compound of polydimethylsiloxane, polydimethylsiloxane carbitol-modified polyol, and the like.

A diamine may be used in combination with the polyol. As examples of the odiamine, ethylenediamine, tetramethylenediamine, hexamethylenediamine, p-phenylenediamine, 4,4'-diaminodiphenylmethane, diamine containing a hetero atom, polyether diamine, and the like can be given.

Of these polyols, the polyether polyol, particularly the aliphatic polyether polyol, is preferable. Specifically, polypropylene glycol and a copolymer of butene-1-oxide and ethylene oxide are preferable. The polyether polyol is commercially available as PPG400, PPG1000, PPG2000, PPG3000, Excenol 720, 1020, 2020 (manufactured by Asahi Glass Urethane Co., Ltd.), and the like. The copolymer of butene-1-oxide and ethylene oxide is commercially available as EO/BO500, EO/BO1000, EO/BO2000, EO/BO3000, EO/BO4000 (manufactured by Daiichi Kogyo Seiyaku Co., Ltd.), and the like.

As examples of the diisocyanate, 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexyl isocyanate), 2,2,4-trimethylhexamethylene diisocyanate, bis(2-isocyanate ethyl)fumarate, 6-isopropyl-1,3-phenyl diisocyanate, 4-diphenylpropane diisocyanate, lysine diisocyanate, hydrogenated diphenylmethane diisocyanate, hydrogenated xylylene diisocyanate, tetramethylxylylene diisocyanate, 2,5(2,6)-bis(isocyanatomethyl)-bicyclo[2.2.1]heptane, and the like can be given. Of these, 2,4-tolylene diisocyanate, isophorone diisocyanate, xylylene diisocyanate, methylenebis(4-cyclohexyl isocyanate), and the like are particularly preferable.

These diisocyanates may be used either individually or in combination of two or more.

Examples of hydroxyl group-containing (meth)acrylate are 2-hydroxyethyl(meth)acrylate, 2-hydroxypropyl(meth)acrylate, 2-hydroxybutyl(meth)acrylate, 2-hydroxy-3-phenyloxypropyl(meth)acrylate, 1,4-butane polyol mono(meth)acrylate, 2-hydroxyalkyl(meth)acryloyl phosphate, 4-hydroxycyclohexyl(meth)acrylate, 1,6-hexanepolyol mono(meth)acrylate, neopentyl glycol mono(meth)acrylate, trimethylolpropane di(meth)acrylate, trimethylolethane di(meth)acrylate, pentaerythritol tri(meth)acrylate, dipentaerythritol penta(meth)acrylate, and (meth)acrylates shown by the following formula (1) or (2).

(1)

(2)

wherein R$^1$ represents a hydrogen atom or a methyl group, and n represents an integer from 1 to 15. A compound obtained by the addition reaction of a glycidyl group-containing compound, such as alkyl glycidyl ether, allyl glycidyl ether, or glycidyl(meth)acrylate, with (meth)acrylic acid may also be used.

Of these hydroxyl group-containing (meth)acrylates, 2-hydroxyethyl(meth)acrylate and 2-hydroxypropyl(meth)acrylate are preferable.

These hydroxyl group-containing (meth)acrylate compounds may be used either individually or in combination of two or more.

The polyol, diisocyanate, and hydroxyl group-containing (meth)acrylate are preferably used so that the isocyanate group in the diisocyanate and the hydroxyl group in the hydroxyl group-containing (meth)acrylate are respectively 1.1 to 3 equivalents and 0.2 to 1.5 equivalents for one equivalent of the hydroxyl group in the polyol.

In the reaction of these compounds, it is preferable to use a urethanization catalyst, such as copper naphthenate, cobalt naphthenate, zinc naphthenate, dibutyltin dilaurate, triethylamine, 1,4-diazabicyclo[2.2.2]octane, or 2,6,7-trimethyl-1,4-diazabicyclo[2.2.2]octane, in an amount of 0.01 to 1 part by weight for 100 parts by weight of the total amount of the reactants. The reaction temperature is usually 10 to 90° C., and preferably 30 to 80° C.

A part of the hydroxyl group-containing (meth)acrylate may be replaced by a compound having a functional group which can be added to an isocyanate group. As examples of such a compound, γ-mercaptotrimethoxysilane, γ-aminotrimethoxysilane, and the like can be given. Use of these compounds improves adhesion to a substrate such as glass.

A urethane (meth)acrylate obtained by reacting 1 mol of the diisocyanate with 2 mol of the hydroxyl group-containing (meth)acrylate compound may be added to the curable liquid resin composition of the present invention. Examples of such a urethane(meth)acrylate include a reaction product of hydroxyethyl(meth)acrylate and 2,4-tolylene diisocyanate, a reaction product of hydroxyethyl(meth)acrylate and 2,5(2,6)-bis(isocyanatomethyl)-bicyclo[2.2.1]heptane, a reaction product of hydroxyethyl(meth)acrylate and isophorone diisocyanate, a reaction product of hydroxypropyl(meth)acrylate and 2,4-tolylene diisocyanate, and a reaction product of hydroxypropyl(meth)acrylate and isophorone diisocyanate.

The urethane (meth)acrylate (A) is added to the composition of the present invention in an amount of 30 to 90 wt %, preferably 55 to 87 wt %, and still more preferably 65 to 85 wt % for 100 wt % of the components (A), (B), and (C) in total. If the amount is less than 30 wt %, the modulus of elasticity of the composition significantly varies depending on the temperature. If the amount exceeds 90 wt %, the curable liquid resin composition may have an unduly high viscosity.

The component (A) can also be a (meth)acrylate oligomer, for example, non-urethane (meth)acrylate oligomer such as bisphenol A epoxy acrylate CN 120Z available from Sartomer, Photomer 3016 available from Cognis, Ebecryl 3700 available from UCB, epoxy novolac acrylated CN112 available from Sartomer, and the like. The (meth)acrylate oligomer (A) is added to the composition of the present invention in an amount of 30 to 90 wt %, preferably 55 to 87 wt %, and still more preferably 65 to 85 wt % for 100 wt % of the components (A), (B), and (C) in total.

As the reactive diluent (B), a polymerizable monofunctional compound or a polymerizable polyfunctional compound may be used. Examples of the monofunctional compound include vinyl group-containing lactams such as N-vinylpyrrolidone and N-vinylcaprolactam; alicyclic structure-containing (meth)acrylates such as isobornyl(meth)acrylate, bornyl(meth)acrylate, tricyclodecanyl(meth)acrylate, and dicyclopentanyl(meth)acrylate; benzyl(meth)acrylate, 4-butylcyclohexyl(meth)acrylate, acryloylmorpholine, vinylimidazole, vinylpyridine, and the like. Further examples include 2-hydroxyethyl(meth)acrylate, 2-hydroxypropyl(meth)acrylate, 2-hydroxybutyl(meth)acrylate, methyl(meth)acrylate, ethyl(meth)acrylate, propyl(meth)acrylate, isopropyl(meth)acrylate, butyl(meth)acrylate, anyl(meth)acrylate, isobutyl(meth)acrylate, t-butyl(meth)acrylate, pentyl(meth)acrylate, isoamyl(meth)acrylate, hexyl(meth)acrylate, heptyl(meth)acrylate, octyl(meth)acrylate, isooctyl(meth)acrylate, 2-ethylhexyl(meth)acrylate, nonyl(meth)acrylate, decyl(meth)acrylate, isodecyl(meth)acrylate, undecyl(meth)acrylate, dodecyl(meth)acrylate, lauryl(meth)acrylate, stearyl(meth)acrylate, isostearyl(meth)acrylate, tetrahydrofurfuryl(meth)acrylate, butoxyethyl(meth)acrylate, ethoxydiethylene glycol(meth)acrylate, benzyl(meth)acrylate, phenoxyethyl(meth)acrylate, polyethylene glycol mono(meth)acrylate, polypropylene glycol mono(meth)acrylate, methoxyethylene glycol(meth)

acrylate, ethoxyethyl(meth)acrylate, methoxypolyethylene glycol(meth)acrylate, methoxypolypropylene glycol(meth)acrylate, diacetone(meth)acrylamide, isobutoxymethyl(meth)acrylate, N,N-dimethyl(meth)acrylamide, t-octyl(meth)acrylamide, dimethylaminoethyl(meth)acrylate, diethylaminoethyl(meth)acrylate, 7-amino-3,7-dimethyloctyl(meth)acrylate, N,N-diethyl(meth)acrylamide, N,N-dimethylaminopropyl(meth)acrylamide, hydroxybutyl vinyl ether, lauryl vinyl ether, cetyl vinyl ether, 2-ethylhexyl vinyl ether, and compounds shown by the following formulas (3) to (6).

wherein $R^2$ represents a hydrogen atom or a methyl group, $R^3$ represents an alkylene group having 2 to 6, and preferably 2 to 4 carbon atoms, $R^4$ represents a hydrogen atom or an alkyl group having 1 to 12, and preferably 1 to 9 carbon atoms, and r represents an integer from 0 to 12, and preferably from 1 to 8.

wherein $R^5$ represents a hydrogen atom or a methyl group, $R^6$ represents an alkylene group having 2 to 8, and preferably 2 to 5 carbon atoms, $R^7$ represents a hydrogen atom or a methyl group, and p represents an integer from 1 to 4.

wherein $R^8$, $R^9$, $R^{10}$, and $R^{11}$ individually represent a hydrogen atom or a methyl group, and q represents an integer from 1 to 5.

Of these polymerizable monofunctional compounds, the vinyl group-containing lactams such as N-vinylpyrrolidone and N-vinylcaprolactam, isobornyl(meth)acrylate, and lauryl acrylate are preferable.

These polymerizable monofunctional compounds are commercially available as IBXA (manufactured by Osaka Organic Chemical Industry, Ltd.), Aronix M-111, M-113, M-114, M-117, TO-1210 (manufactured by Toagosei Co., Ltd.), and the like.

Examples of the polymerizable polyfunctional compound include trimethylolpropane tri(meth)acrylate, trimethylolpropanetrioxyethyl(meth)acrylate, pentaerythritol tri(meth)acrylate, triethylene glycol diacrylate, tetraethylene glycol di(meth)acrylate, tricyclodecanediyldimethylene di(meth)acrylate, 1,4-butane polyol di(meth)acrylate, 1,6-hexane polyol di(meth)acrylate, neopentyl glycol di(meth)acrylate, tripropylene glycol di(meth)acrylate, neopentyl glycol di(meth)acrylate, both terminal (meth)acrylic acid addition product of bisphenol A diglycidyl ether, pentaerythritol tri(meth)acrylate, pentaerythritol tetra(meth)acrylate, polyester di(meth)acrylate, tris(2-hydroxyethyl)isocyanurate tri(meth)acrylate, tris(2-hydroxyethyl)isocyanurate di(meth)acrylate, tricyclodecanedimethanol di(meth)acrylate, di(meth)acrylate of ethylene oxide or propylene oxide addition bisphenol A, di(meth)acrylate of ethylene oxide or propylene oxide addition hydrogenated bisphenol A, epoxy(meth)acrylate prepared by the addition of (meth)acrylate to diglycidyl ether of bisphenol A, triethylene, glycol divinyl ether, compounds shown by the following formula (7), and the like.

wherein $R^{12}$ and $R^{13}$ individually represent a hydrogen atom or a methyl group, and n represents an integer from 1 to 100.

Of these polymerizable polyfunctional compounds, the compounds shown by the above formula (7), such as ethylene glycol di(meth)acrylate, polyethylene glycol di(meth)acrylate, tricyclodecanediyldimethylene di(meth)acrylate, di(meth)acrylate of ethylene oxide addition bisphenol A, and tris(2-hydroxyethyl)isocyanurate tri(meth)acrylate, are preferable.

These polymerizable polyfunctional compounds are commercially available as Yupimer UW, SA1002 (manufactured by Mitsubishi Chemical Corp.), Aronix M-215, M-315, M-325 (manufactured by Toagosei Co., Ltd.), and the like.

In addition, Aronix TO-1210 (manufactured by Toagosei Co., Ltd.) may also be used.

The reactive diluent (B) is used in the composition of the present invention in an amount of usually 1 to 70 wt %, preferably 5 to 50 wt %, and particularly preferably 10 to 40 wt % for 100 wt % of the components (A), (B), and (C) in total. If the amount is less than 1 wt %, curability may be impaired. If the amount exceeds 70 wt %, the applied composition may flow due to low viscosity.

The curable liquid resin composition of the present invention further comprises a polymerization initiator as the component (C). As the polymerization initiator, a heat polymerization initiator or a photoinitiator may be used.

If the curable liquid resin composition of the present invention is heat-curable, a heat polymerization initiator such as a peroxide or an azo compound is usually used. As specific examples of the heat polymerization initiator, benzoyl peroxide, t-butyl oxybenzoate, azobisisobutyronitrile, and the like can be given.

If the curable liquid resin composition of the present invention is photo-curable, a photoinitiator is used. It is preferable to use a photosensitizer in combination as required. Given as examples of the photoinitiator are 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl methyl ketal, 1-(4-isopropylphenyl)-2-hydroxy-2-methylpropan-1-one, 2-hydroxy-2-methyl-1-phenylpropan-1-one, thioxanethone, diethylthioxanthone, 2-isopropylthioxanthone, 2-chlorothioxanthone, 2-methyl-1-[4-(methylthio)phenyl]-2-morpholino-propan-1-one, 2,4,6-trimethylbenzoyldiphenylphosphine oxide, bis-(2,6-dimethoxybenzoyl)-2,4,4-trimethylpentylphosphine oxide; Irgacure 184, 369, 651, 500, 907, CGI1700, CGI1750, CGI1850, CG24-61, Darocur 1116, 1173 (manufactured by Ciba Specialty Chemicals Co.); Lucirin TPO (manufactured by BASF); Ubecryl P36 (manufactured by UCB), and the like. As examples of the photosensitizer, triethylamine, diethylamine, N-methyldiethanoleamine, ethanolamine, 4-dimethylaminobenzoic acid, methyl 4-dimethylaminobenzoate, ethyl 4-dimethylaminobenzoate, isoamyl 4-dimethylaminobenzoate; Ubecryl P102, 103, 104, 105 (manufactured by UCB); and the like can be given.

If both heat and ultraviolet rays are used to cure the curable liquid resin composition of the present invention, the heat polymerization initiator and the photoinitiator may be used in combination. The polymerization initiator (C) is used in an amount of preferably 0.1 to 10 wt %, and particularly preferably 0.3 to 7 wt % of for the total amount of 100 wt % of the components (A), (B), and (C).

The curable liquid resin composition of the present invention further comprises a polyol compound having a molecular weight of 1500 or more as the component (D). The component (D) is important for improving removability of an optical fiber upjacket layer formed of the resin composition of the present invention from an adjacent layer. If the molecular weight of the component (D) is less than 1500, durability may be decreased due to a problem relating to a transfer to an ink layer. The molecular weight of the polyol compound is preferably 1500 to 10000, more preferably 2000 to 8000.

As examples of the polyol compound used in the component (D), a polyether polyol, polyester polyol, polycarbonate polyol, polycaprolactone polyol, and the like can be given. There are no specific limitations to the manner of polymerization of the structural units of these polyols, which may be any of random polymerization, block polymerization, and graft polymerization.

Of these polyol compounds, a polyether polyol having a molecular weight of 1500 or more is preferable. As examples of the polyether polyol, polyethylene glycol, polypropylene glycol, polytetramethylene glycol, polyhexamethylene glycol, polyheptamethylene glycol, polydecamethylene glycol, aliphatic polyether polyol obtained by ring-opening copolymerization of two or more ion-polymerizable cyclic compounds, and the like can be given. As examples of the ion-polymerizable cyclic compound, cyclic ethers such as ethylene oxide, propylene oxide, butene-1-oxide, isobutene oxide, 3,3-bischloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyloxetane, vinyltetrahydrofuran, vinylcyclohexene oxide, phenyl glycidyl ether, butyl glycidyl ether, glycidyl benzoate, and the like can be given. Moreover, a polyether polyol obtained by ring-opening copolymerization of the above ion-polymerizable cyclic compound with a cyclic imine such as ethyleneimine, cyclic lactonic acid such as β-propyolactone or glycolic acid lactide, or dimethylcyclopolysiloxane may be used. As examples of specific combinations of two or more ion-polymerizable cyclic compounds, tetrahydrofuran and propylene oxide, tetrahydrofuran and 2-methyltetrahydrofuran, tetrahydrofuran and 3-methyltetrahydrofuran, tetrahydrofuran and ethylene oxide, propylene oxide and ethylene oxide, butene-1-oxide and ethylene oxide, a ternary copolymer of tetrahydrofuran, butene-1-oxide, and ethylene oxide, and the like can be given. The ring-opening copolymer of the ion-polymerizable cyclic compounds may either be a random copolymer or a block copolymer.

These aliphatic polyether polyols are commercially available as PTMG2000 (manufactured by Mitsubishi Chemical Corp.), PPG2000, PPG3000, Excenol 2020 (manufactured by Asahi Glass Urethane Co., Ltd.), DC1800 (manufactured by Nippon Oil and Fats Co., Ltd.), PPTG2000, PTGL2000 (manufactured by Hodogaya Chemical Co., Ltd.), PBG2000A, PBG2000B (manufactured by Daiichi Kogyo Seiyaku Co., Ltd.), Acclaim 4200 (manufactured by Bayer Polymer LLC.), Pluracol 2010 from BASF Corp.) and the like.

Examples of the polyether polyol further include cyclic polyether polyols such as alkylene oxide addition polyol of bisphenol A, alkylene oxide addition polyol of bisphenol F, hydrogenated bisphenol A, hydrogenated bisphenol F, alkylene oxide addition polyol of hydrogenated bisphenol A, alkylene oxide addition polyol of hydrogenated bisphenol F, alkylene oxide addition polyol of hydroquinone, alkylene oxide addition polyol of naphthohydroquinone, alkylene oxide addition polyol of anthrahydroquinone, 1,4-cyclohexane polyol and alkylene oxide addition polyol thereof, tricyclodecane polyol, tricyclodecanedimethanol, pentacyclopentadecane polyol, and pentacyclopentadecanedimethanol. Examples of other cyclic polyether polyols include alkylene oxide addition polyol of bisphenol A, alkylene oxide addition polyol of bisphenol F, and alkylene oxide addition polyol of 1,4-cyclohexane polyol. The polyol may contain only a linear molecular, or may have a branched structure.

The curable liquid resin composition of the present invention preferably includes a polyol having a branched structure containing an alkyl group such as a methyl group or ethyl group in which a hydroxyl group is bonded to each branched chain terminal, with the value obtained by dividing the molecular weight of the polyol by the number of the hydroxyl groups at the branched chain terminals being 500 to 2000 (hereinafter also referred to as "branched structure-containing polyol").

As specific examples of the branched structure-containing polyol, a polyol obtained by ring-opening polymerization of glycerol or sorbitol with at least one compound selected from ethylene oxide, propylene oxide, and butylene oxide is preferable, with polypropylene glycol and a copolymer of butene-1-oxide and ethylene oxide being particularly preferable.

The value obtained by dividing the molecular weight of the polyol by the number of the hydroxyl groups at the branched chain terminals is preferably 500 to 2000, and more preferably 1000 to 1500. The number average molecular weight of the polyol is preferably 1500 to 12000, more preferably 2000 to 10000, and particularly preferably 2500 to 8000, as the polystyrene-reduced molecular weight determined by gel permeation chromatography.

The structure-containing polyol preferably contains 3 to 6 hydroxyl groups at the branched chain terminals in one molecule.

The polyol is commercially available as PPG2000, PPG3000, Excenol 2020 (manufactured by Asahi Glass Urethane Co., Ltd.), and the like. The copolymer of butene-1-oxide and ethylene oxide is commercially available as EO/BO2000, EO/BO3000, EO/BO4000 (manufactured by Daiichi Kogyo Seiyaku Co., Ltd.), and the like.

The branched structure-containing polyol is commercially available as Sannix TP-400, Sannix GL-3000, Sannix GP-250, Sannix GP-400, Sannix GP-600, Sannix GP-1000, Sannix GP-3000, Sannix GP-3700M, Sannix GP-4000, Sannix GEP-2800, Newpol TL4500N (manufactured by Sanyo Chemical Industries, Ltd), and the like.

The component (D) is added in an amount of preferably 0.1 to 50 wt %, still more preferably 1 to 30 wt %, and particularly preferably 1 to 20 wt % for 100 wt % of the component (A),(B), and (C) in total, in order to ensure removability, strength, and weatherability of the resulting upjacket layer.

A flame retardant (E) may also be added to the curable liquid resin composition of the present invention. There are no specific limitations to the flame retardant (E). Examples of the flame retardant (E) include a halogen-based (bromine-based or chlorine-based) flame retardant, phosphorus-based flame retardant, nitrogen-based flame retardant and silicone-based flame retardant.

Examples of the bromine-based flame retardant include tetrabromobisphenol A (TBBPA), decabromodiphenyl oxide, hexabromocyclododecane, tribromophenol, ethylenebistetrabromophthalimide, TBBPA polycarbonate oligomer, brominated polystyrene, TBBPA epoxy oligomer, TBBPA bis-bromopropyl ether, ethylenebispentabromodiphenol, pentabromobenzyl acrylate, hexabromobenzene, brominated aromatic triazine, and the like.

As examples of the phosphorus-based flame retardant, a phosphate, halogen-containing phosphate, ammonium polyphosphate, red phosphorus compound, phosphaphenanthrene, and the like can be given.

As examples of the chlorine-based flame retardant, a chlorinated paraffin, perchlorocyclopentadecane, chlorendic acid, and the like can be given.

The flame retardant (E) is used in the composition in an amount of preferably 1.0 to 50 wt %, and particularly preferably 1 to 20 wt % for 100 wt % of the components (A), (B), and (C) in total. If the amount is less than 1.0 wt %, the flame retarding effect may be insufficient. If the amount exceeds 50 wt %, the flame retardant may bleed out from the resulting cured product, or the elastic performance of the resulting upjacket layer may be adversely affected.

The curable liquid resin composition of the present invention further comprises a silicone compound having an average molecular weight of 1500 to 35000. The silicone compound is important for improving removability of an optical fiber upjacket layer formed of the resin composition of the present invention from an adjacent layer.

A silicone compound such as polyether-modified silicone, alkyl-modified silicone, urethane acrylate-modified silicone, urethane-modified silicone, methylstyryl-modified silicone, epoxy polyether-modified silicone, alkylaralkyl polyether-modified silicone, and the like can be added to the composition of the invention. As the polyether-modified silicone, a polydimethylsiloxane compound in which a group represented by $R^{14}$—$(R^{15}O)_s$—$R^{16}$— (wherein $R^{14}$ represents a hydroxyl group or an alkoxy group having 1 to 10 carbon atoms, $R^{15}$ represents an alkylene group having 2 to 4 carbon atoms ($R^{15}$ may contain two or more types of alkylene groups), $R^{16}$ represents an alkylene group having 2 to 12 carbon atoms, and s represents an integer from 1 to 20) is bonded to at least one silicon atom is preferable. As the alkylene group represented by $R^{15}$, an ethylene group or a propylene group is preferable, with ethylene group being particularly preferable. The silicone compound is commercially available as SH28PA: dimethylpolysiloxane-polyoxyalkylene copolymer (manufactured by Dow Corning Toray Co., Ltd.), Pantad 19, 54: dimethylpolysiloxane-polyoxyalkylene copolymer (manufactured by Dow Corning Toray Co., Ltd.), FM0411: dimethylpolysiloxane-polyoxyalkylene copolymer (manufactured by Chisso Corp.), dimethylpolysiloxane-polyoxyalkylene copolymer (containing side-chain OH)(manufactured by Dow Corning Toray Co., Ltd.), Bykuv 3510: dimethylpolysiloxane-polyoxyalkylene copolymer (manufactured by BYK-Chemie Japan.), DC57: dimethylpolysiloxane-polyoxyalkylene copolymer (manufactured by Dow Corning Toray Co., Ltd.), DC190: dimethylplysiloxane-PEG/PPG copolymer from Dow Corning, and the like.

The silicone compound is added in an amount of preferably 0 to 50 wt %, more preferably 1 to 50%, still more preferably 0.5 to 40 wt %, and particularly preferably 1 to 20 wt % for 100 wt % of the component (A),(B), and (C) in total.

A urethane acrylate-containing polydimethylpolysiloxane compound (polydimethylpolysiloxane compound containing at least two urethane bonds in one molecule, non-reactive organic group at least at one terminal, and (meth)acryloyl group at least at one terminal), which is a reactive silicone, may also be added to the composition of the present invention. An improved removability can be obtained by using the urethane acrylate-containing polydimethylpolysiloxane compound in combination with the component (D). The urethane acrylate-containing silicone compound may be synthesized by urethanizing a hydroxy-group containing silicone compound. As examples of the hydroxyl group-containing silicone compound, a silicone compound containing a hydroxyl group at one terminal, such as polydimethylsiloxane containing an organic group such as a 3-(2'-hydroxyethoxy)propyl group, 3-(2',3'-dihydroxypropyloxy)propyl group, 3-(2'-ethyl-2'-hydroxymethyl-3-hydroxy)propyl group, or 3-(2'-hydroxy-3'-isopropylamino)propyl group at one terminal, and containing a non-reactive organic group such as a trimethylsilyloxy group at the other terminal, can be given. These compounds may be used either individually or in combination of two or more. The above silicone compound containing a hydroxyl group at one terminal is commercially available as Silaplane FM-0411, FM-0421, FM-0425, FM-D411, FM-D421, FM-D425 (manufactured by Chisso Corp.), TSL9105 (manufactured by Toshiba Silicone Co., Ltd.), and Shin-Etsu Silicone X-22-170A, X-22-170B, X-22-170D, X-22-176B, X-22-176D, X-22-176DX, X-22-178A, X-22-178B (manufactured by Shin-Etsu Chemical Co., Ltd.).

The urethane acrylate-containing silicone compound (a urethane acrylate containing FM0411) is added to the composition in an amount of preferably 1.0 to 20.0 wt %, and particularly preferably 1 to 15.0 wt % for 100 wt % of the components (A), (B), and (C) in total. If the amount of the urethane acrylate-containing silicone compound is less than 1.0 wt %, the effect of reducing coating removal stress is insufficient. If the amount exceeds 10 wt %, liquid resin storage stability may deteriorate.

Various additives such as an antioxidant, coloring agent, UV absorber, light stabilizer, silane coupling agent, heat polymerization inhibitor, leveling agent, surfactant, preservative, plasticizer, lubricant, solvent, filler, aging preventive, wettability improver, and coating surface improver may be optionally added to the curable liquid resin composition of the present invention insofar as the properties of the composition are not adversely affected.

The composition of the present invention is cured by applying heat and/or radiation. Radiation used herein includes infrared rays, visible rays, ultraviolet rays, X-rays, electron beams, $\alpha$-rays, $\beta$-rays, $\gamma$-rays, and the like.

The Young's modulus of the cured product of the curable liquid resin composition of the present invention is about 100 MPa to about 600 MPa, preferably about 200 to about 580 MPa. The composition is preferably applied to a fiber to a thickness of 100 to 350 μm when forming an upjacket layer.

EXAMPLES

The present invention is described in detail by way of examples, which should not be construed as limiting the present invention.

A. [Preparation Example: Preparation of Curable Resin Composition of Examples 1-5 and Comparative Examples 1-3] (Table 1)

A reaction vessel equipped with a stirrer was charged with 15.381 g of tetraethylene nonyl phenyl ether acrylate, 0.015 g of 2,6-di-t-butyl-p-cresol, 7.80 g of toluene diisocyanate, and 0.023 g of dibutyltin dilaurate. The mixture was cooled with ice to 15 to 20° C. with stirring. After the addition of 6.00 g of hydroxyethyl acrylate, the mixture was allowed to react for two hours with stirring while controlling the solution temperature at 35° C. or less. After the addition of 28.341 g of polytetramethylene glycol with a number average molecular weight of 2000, 1.790 g of polyethylene bisphenol A ether with a number average molecular weight of 400, and 0.022 g of dibutyltin dilaurate, the mixture was stirred at room temperature for one hour. The mixture was then stirred at 65° C. for two hours in an oil bath. The reaction was terminated when the residual isocyanate content became 0.1 wt % or less. The resulting product was a mixed solution of three types of urethane (meth)acrylate oligomers shown in Table 1.

The mixed solution was then brought to room temperature. After the addition of 2.90 g of Irgacure 184 (manufactured by Ciba Specialty Chemicals Co., Ltd.), 0.30 g of Irganox 1035 (manufactured by Ciba Specialty Chemicals Co., Ltd.), 5.770 g of N-vinyl-2-pyrrolidone, 15.4 g of polyoxyethylene nonyl phenyl ether acrylate (M113: manufactured by Toagosei Co., Ltd.), 2.275 g of tricyclodecanedimethylol diacrylate (SA 1002: manufactured by Mitsubishi Chemical Corp.), and 28.90 g of trimethylolpropane ethoxy triacrylate (Photomer 4149: manufactured by Osaka Organic Chemical Industry, Ltd.) to the mixed solution, the mixture was stirred at 50° C. for one hour to obtain a target curable resin composition.

Examples 1 to 3 and Comparative Examples 1 to 5

A reaction vessel equipped with a stirrer was charged with each component of the composition shown in Table 1. The mixture was stirred at 50° C. for one hour to obtain a curable liquid resin composition.

Test Methods

The curable liquid resin compositions obtained in the examples and comparative examples were cured to prepare test specimens. The test specimens were subjected to the following evaluations.

1. Young's Modulus

The curable liquid resin composition was applied to a glass plate using an applicator bar with a gap size of 250 μm, and cured by applying ultraviolet rays at a dose of 1 J/cm$^2$ in air to obtain a Young's modulus measurement film. The film was cut into a sample in the shape of a strip so that the portion to be stretched had a width of 6 mm and a length of 25 mm. The sample was subjected to a tensile test at a temperature of 23° C. and a humidity of 50%. The Young's modulus was calculated from the tensile strength at a tensile rate of 1 mm/min and a strain of 2.5%.

2. Removability

A primary material (R1164: manufactured by JSR Corporation), a secondary material (R3180: manufactured by JSR Corporation), and an ink material (FS blue ink: T&K TOKA) were applied to a glass fiber and cured by applying ultraviolet rays using a rewinder model (manufactured by Yoshida Kogyo Co., Ltd.) to obtain a resin-coated optical fiber having an outer diameter of 250 μm. The curable composition shown in Table 1 was applied to the resin-coated optical fiber as an upjacket material, and cured by applying ultraviolet rays using the above rewinder model to obtain an upjacketed optical fiber having an outer diameter of 500 μm. The resulting upjacketed optical fiber was used as the measurement sample.

Figure 1:
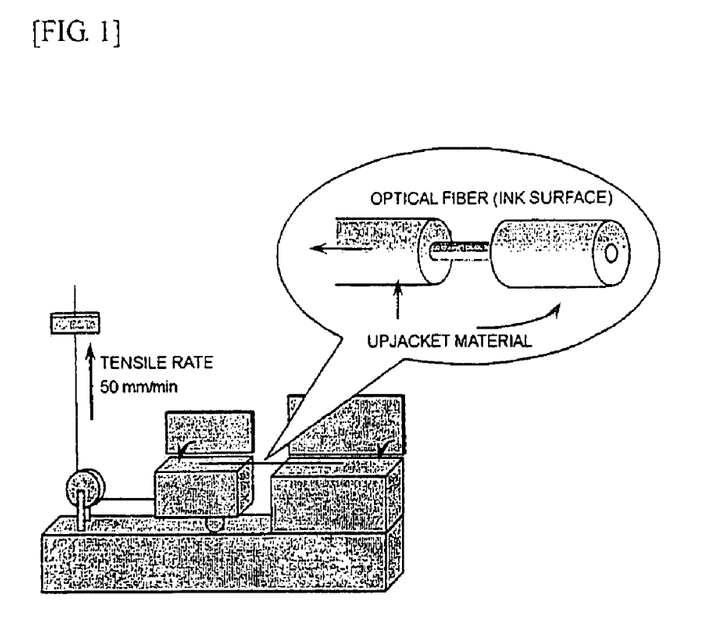
FIG. 1 shows a conceptual diagram of a tensile tester.
Figure 2:
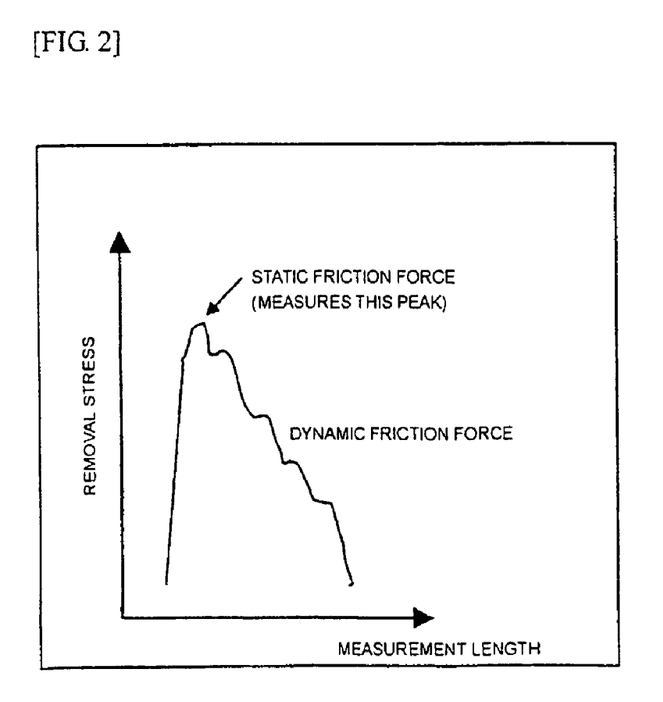
FIG. 2 shows a conceptual diagram of coating removal stress when removing an upjacket layer.

As shown in FIG. 1, the upjacketed optical fiber was held by using a hot stripper (manufactured by Furukawa Electric Co., Ltd.) at a position 3 cm from the end. The upjacketed optical fiber was then pulled at a tensile rate of 50 m/min by using a tensile tester (manufactured by Shimadzu Corp.) to measure the coating removal stress (maximum stress shown in FIG. 2) when removing the upjacket layer. The measurement was carried out immediately after producing the upjacketed optical fiber (hereinafter referred to as "coating removal stress immediately after production"). The measurement was also carried out after allowing the upjacketed optical fiber to stand at a temperature of 23° C. and a relative humidity of 50% for 7 days (hereinafter referred to as "coating removal stress after high-temperature and high-humidity test").

This test method for measuring the removability is hereinafter referred as "50 in/min test method".

The composition of the present invention, when cured, has a coating removal stress immediately after production of no more than 3.1N, when measured by the 50 m/min test method.

The composition of the present invention, when cured, has a coating removal stress after high-temperature and high-humidity test of no more than 3.1N, when measured by the 50 m/min test method.

The results are shown in Table 1.

B. [Preparation of Examples 6 to 8]: (Table 2)

The urethane acrylate oligomer TH-PPG1000-TH was prepared by reacting toluene diisocyanate and 2-HEA. The reaction vessel containing the isocyanate with reactive terminus was then reacted with the polyether polyol P1010 in the presence of dibutyltin dilaurate until the unreacted level was found to be less than 0.1%.

The upjacketed coating composition of Example 6 was prepared by mixing and heating the urethane acrylate oligomer with other ingredients listed in Example 6.

The upjacketed coating compositions of Examples 7 and 8 were prepared by mixing and heating the ingredients listed in Example 7 and 8.

Test Methods:

1. Young's Modulus: See Part A of Examples Section

2. Removability:

A primary material (Desolite3471-1-129A: manufactured by DSM Desotech, Inc.), a secondary material (3471-2-136: manufactured by DSM Desotech, Inc.), and an ink material (Cabelite 751-017: manufactured by Desotech, Inc.) were applied to a glass fiber and cured by applying ultraviolet rays using a rewinder model OFC 52 (manufactured by Nextrom Technologies, Inc.) to obtain a resin-coated optical fiber having an outer diameter of 250 μm. The curable composition shown in Table 2 was applied to the resin-coated optical fiber as an upjacket material, and cured by applying ultraviolet rays using the above rewinder model to obtain an upjacketed optical fiber having an outer diameter of 500 μm). The resulting upjacketed optical fiber was used as the measurement sample.

The removability characteristics of the cured upjacketed coating was determined by measuring the peak force required to remove the cured upjacketed coating from the optical fiber using a stripping tool, the Micro-Strip Precision Stripper, available from Micro Electronics Inc. A test method was developed on an Instron Tensile Tester Model 4201 or equivalent. This method allows quantitative and repeatable measurements to be made, thus allowing the differentiation between coating systems. The stripper tool is mounted in the bottom grips of the Instron Tensile Tester, after the fiber has been inserted into the stripper and the bottom of the tool has been secured tight with a small clamp. A constant amount of fiber, 1 inch, is stripped through the blades, this length is measured as the sample is placed into the stripping tool. The top of the fiber is secured in the pneumatic top grip of the Instron. The initial distance between both grips is one inch. An appropriate load cell is used to determine the maximum force that is required to remove the tight-buffer coating. The crosshead speed of the Instron is set at a constant pull rate of 20 inches/min.

The measurement was carried out immediately after producing the upjacketed optical fiber (hereinafter referred to as "coating removal stress immediately after production"). The measurement was also carried out after allowing the upjacketed optical fiber to stand at a temperature of 85° C. and a relative humidity of 85% for 7 days (hereinafter referred to as "coating removal stress after high-temperature and high-humidity test"). This test method for measuring the removability is hereinafter referred as "20 inches/min test method".

The composition of the present invention, when cured, has a coating removal stress immediately after production of less than 1800 g, when measured by the 20 inches/min test method.

The composition of the present invention, when cured, has a coating removal stress after high-temperature and high-humidity test of less than 1800 g, when measured by the 20 inches/min test method The results are shown in Table 2.

TABLE 1

|   |   | Example | | | Comparative Example | | | | |
|---|---|---|---|---|---|---|---|---|---|
|   |   | 1 | 2 | 3 | 1 | 2 | 3 | 4 | 5 |
| A | HT-DA400-TH | 4.4 | 4.4 | 4.4 | 4.4 | 4.4 | 4.4 | 4.4 | 4.4 |
|   | HT-PTMG2000-TH | 36.6 | 36.6 | 36.6 | 36.6 | 36.6 | 36.6 | 36.6 | 36.6 |
|   | HTH | 3.0 | 3.0 | 3.0 | 3.0 | 3.0 | 3.0 | 3.0 | 3.0 |
| B | N-Vinyl-2-pyrrolidone | 5.8 | 5.8 | 5.8 | 5.8 | 5.8 | 5.8 | 5.8 | 5.8 |
|   | Polyoxyethylene nonyl phenyl ether acrylate | 15.4 | 15.4 | 15.4 | 15.4 | 15.4 | 15.4 | 15.4 | 15.4 |
|   | Tricyclodecanedimethylol diacrylate | 2.3 | 2.3 | 2.3 | 2.3 | 2.3 | 2.3 | 2.3 | 2.3 |
|   | Trimethylolpropane ethoxy triacrylate | 28.9 | 28.9 | 28.9 | 28.9 | 28.9 | 28.9 | 28.9 | 28.9 |
| C | Irgacure 184 | 2.9 | 2.9 | 2.9 | 2.9 | 2.9 | 2.9 | 2.9 | 2.9 |
|   | Irganox 1035 | 0.3 | 0.3 | 0.3 | 0.3 | 0.3 | 0.3 | 0.3 | 0.3 |
|   | Total | 99.6 | 99.6 | 99.6 | 99.6 | 99.6 | 99.6 | 99.6 | 99.6 |
| D | Polypropylene glycol (molecular weight: 4000) | 10.0 | 10.0 | 10.0 |   |   |   |   |   |
|   | Polypropylene glycol (molecular weight: 1000) |   |   |   |   |   |   |   | 4.0 |
|   | Urethane acrylate modified FM0411 |   |   |   |   | 10.0 |   |   |   |
|   | Triisopropylphenyl phosphate |   |   |   |   |   |   |   |   |
|   | Dioctyl phthalate |   |   |   |   |   |   | 10.0 |   |
|   | Young's modulus (MPa) | 162 | 122 | 131 | 260 | 171 | 170 | 163 | 133 |
|   | Coating removal stress immediately after production (N) | 3.10 | 2.90 | 3.00 | 6.50 | 3.10 | 3.80 | 3.90 | 3.20 |
|   | Coating removal stress after high-temperature and high-humidity test (N) | 3.10 | 3.00 | 3.10 | 6.50 | 5.80 | 6.50 | 6.60 | 3.21 |

TABLE 2

|   |   | Example | | |
|---|---|---|---|---|
|   |   | 6 | 7 | 8 |
| A | HT-PPG1010-TH | 30 |   |   |
|   | Bis-phenol A Epoxy Acrylate CN120Z |   | 68.0 | 56.4 |
| B | Isobornyl Acrylate | 7.5 |   |   |
|   | Phenoxy ethyl acrylate | 8.5 |   | 38.5 |
|   | Tripropyleneglycol diacrylate | 6 |   |   |
|   | 2-Ethylhexyl acrylate |   | 28.1 |   |
|   | Hexanediol diacrylate | 4.5 |   |   |
| C | Irgacure 184 | 2 |   |   |
|   | Darocure 1173 |   | 3.9 | 5.1 |
|   | Irganox 1035 | 0.5 |   |   |
|   | Total | 99.5 | 100.0 | 100.0 |
| D | Polypropylene glycol (molecular weight: 4000) | 30 | 25.6 | 25.6 |
|   | Silicone additive DC 57 | 0.17 |   |   |
|   | Silicone additive DC 190 | 0.33 | 2.6 | 2.6 |
|   | Young's modulus (MPa) | 300 | 310 | 560 |
|   | Coating removal stress immediately after production (g) | <1800 g | <1800 g | <1800 g |
|   | Coating removal stress after high-temperature and high-humidity test (g) | <1800 g | <1800 g | <1800 g |

As can be seen from Table 1, since the cured product of the resin composition of the present invention containing a polyol having a molecular weight of 1500 or more exhibits excellent properties as an optical fiber coating material and shows excellent removability, the composition is useful as an upjacket composition.

The invention claimed is:

1. A curable liquid resin optical fiber upjacket composition, comprising:
   (A) 30 to 90 wt % of a urethane (meth)acrylate,
   (B) 1 to 70 wt % of a reactive diluent,
   (C) 0.1 to 10 wt % of a polymerization initiator, and
   (D) 0.1 to 50 wt % of a polyol compound having a molecular weight of 1500 or more, with the total amount of the components (A), (B), and (C) being 100 wt %.

2. A curable liquid resin optical fiber upjacket composition, comprising:
   (A) 30 to 90 wt % of a (meth)acrylate oligomer,
   (B) 1 to 70 wt % of a reactive diluent,
   (C) 0.1 to 10 wt % of a polymerization initiator, and
   (D) 0.1 to 50 wt % of a polyol compound having a molecular weight of 1500 or more, with the total amount of the components (A), (B), and (C) being 100 wt %.

3. The composition according to claim 1, wherein the component (D) is a poly ether polyol.

4. The composition according to claim 1, wherein the component (D) includes a polyol having a molecular weight of 1500 or more, the polyol having a branched structure in which a hydroxyl group is bonded to each branched chain terminal, with the value obtained by dividing the molecular weight of the polyol by the number of the hydroxyl groups bonded to the branched chain terminals being 500 to 2000.

5. The composition according to claim 1, further comprising a silicone compound.

6. The composition according to claim 1, wherein said silicone compound is a reactive silicone.

7. The composition according to claim 1, further comprising a flame retardant.

8. The composition according to claim 1, wherein said composition, when cured, has a Young modulus of about 100 MPa to about 600 MPa.

9. The composition according to claim 1, wherein said composition, when cured, has a coating removal stress immediately after production of no more than 3.1 N, when measured by the 50 m/min test method.

10. The composition according to claim 9, wherein said composition, when cured, has a coating removal stress after high-temperature and high-humidity test of no more than 3.1 N, when measured by the 50 m/min test method.

11. The composition according to claim 1, wherein said composition, when cured, has a coating removal stress after production of less than 1800 g, when measured by the 20 inches/min test method.

12. The composition according to claim 9, wherein said composition, when cured, has a coating removal stress immediately after high-temperature and high-humidity test of less than 1800 g, when measured by the 20 inches/min test method.

13. An optical fiber upjacket layer, comprising a cured product of the composition according to claim 1.

14. An upjacketed optical fiber, comprising the optical fiber upjacket layer according to claim 13.

15. A process of making an optical fiber upjacket layer comprising the step of curing the composition according to claim 1.

16. An upjacket coating exhibiting good removability which comprises the optical fiber upjacket layer according to claim 13.

* * * * *